US012774716B2

(12) United States Patent
Keßler

(10) Patent No.: US 12,774,716 B2
(45) Date of Patent: Oct. 27, 2026

(54) BALL SOCKET FOR A BALL JOINT

(71) Applicant: STABILUS GMBH, Koblenz (DE)

(72) Inventor: Jonathan Keßler, Großholbach (DE)

(73) Assignee: STABILUS GMBH, Koblenz (DE)

( * ) Notice: Subject to any disclaimer, the term of this patent is extended or adjusted under 35 U.S.C. 154(b) by 291 days.

(21) Appl. No.: 18/440,123

(22) Filed: Feb. 13, 2024

(65) Prior Publication Data

US 2024/0309909 A1 Sep. 19, 2024

(30) Foreign Application Priority Data

Mar. 16, 2023 (DE) ......................... 102023106653.6

(51) Int. Cl.
*F16C 11/06* (2006.01)

(52) U.S. Cl.
CPC ... *F16C 11/0623* (2013.01); *Y10T 403/32639* (2015.01); *Y10T 403/32852* (2015.01)

(58) Field of Classification Search
CPC ......... F16C 11/0623; Y10T 403/32639; Y10T 403/32852
See application file for complete search history.

(56) References Cited

U.S. PATENT DOCUMENTS 3,856,422 A * 12/1974 Trefry ................... F16B 21/078 403/122
4,895,472 A * 1/1990 Dony .................. F16C 33/1065 403/135
6,609,850 B2 * 8/2003 Greb ..................... F16C 11/069 403/138
6,810,787 B2 * 11/2004 Welter .................... B60T 11/18 92/188

FOREIGN PATENT DOCUMENTS

| | | | |
|---|---|---|---|
| DE | 195 09 920 A1 | 9/1996 | |
| DE | 10 2006 057 557 A1 | 6/2008 | |
| DE | 10 2010 007 017 A1 | 9/2011 | |
| DE | 10 2019 104 439 A1 | 8/2020 | |
| DE | 10 2019120 132 A1 | 1/2021 | |
| EP | 0 733 815 * | 9/1996 | .............. F16C 11/06 |
| EP | 1 906 034 * | 4/2008 | .............. F16C 11/06 |

* cited by examiner

*Primary Examiner* — Michael P Ferguson
(74) *Attorney, Agent, or Firm* — Schmeiser Olsen PLLC

(57) ABSTRACT

A ball socket for a ball joint is provided, including a base body with a recess for receiving a ball head of the ball joint, wherein the recess includes a support region for supporting the ball head and a cylindrical insertion region for inserting the ball head in an insertion direction into the support region, and a securing element, wherein the securing element includes a connecting region and two retaining legs connected to one another by the connecting region. The base body includes two retaining channels open to the insertion region. The retaining channels extend from the insertion region in a curved manner towards the retaining axis, wherein the free end portions of the retaining legs can be elastically bent, so that the free end portions spring back after the ball head has been pushed into the insertion region in order to fix the ball head in the support region.

12 Claims, 3 Drawing Sheets

BALL SOCKET FOR A BALL JOINT

CROSS-REFERENCE TO RELATED APPLICATIONS

This application claims priority to German Application No. 10 2023 106 653.6, having a filing date of Mar. 16, 2023, the entire contents of which are hereby incorporated by reference.

FIELD OF TECHNOLOGY

The following relates to a ball socket for a ball joint, comprising a base body with a recess for receiving a ball head of the ball joint, wherein the recess comprises a support region for supporting the ball head and a cylindrical insertion region for inserting the ball head in an insertion direction into the support region, and a securing element, wherein the securing element comprises a connecting region and two retaining legs connected to one another by the connecting region. The base body comprises two retaining channels open to the insertion region, wherein the retaining legs are arranged in the retaining channels in such a way that the retaining legs are aligned along a retaining axis extending through a center point of the support region and orthogonally to the insertion direction, and that the free end portions of the retaining legs remote from the connecting region are arranged in sections in the insertion region.

BACKGROUND

Ball joints in which the ball head of the ball joint is secured against being pulled out of the ball socket of the ball joint by a securing element are known from the state of the conventional art.

The securing elements are, for example, as described in the publications DE 195 09 920 A1, DE 10 2019 120 132 A1 or DE 10 2007 007 017 A1, designed as elastic metal rods or metal clips that are inserted into a base body of the ball socket. The disadvantage of metal securing elements is that corrosion can occur, particularly on surfaces that rub against the ball head, which is usually also made of metal. Corrosion has a negative effect on the appearance and function of the ball joint, for example through discolouration, increased friction or reduced mechanical stability.

To overcome these disadvantages, the publication DE 10 2006 057 557 A1 proposes a ball socket made entirely of plastic. However, the securing element of this ball socket has a complex structure, must be precisely adapted to the dimensions of the ball head to ensure reliable securing, and can only be released using a special tool.

SUMMARY

An aspect relates to a simply constructed, easy-to-use and durable ball socket in which the associated ball head is reliably secured.

The ball socket for a ball joint comprises a base body with a recess for receiving a ball head of the ball joint, the recess having a support region for supporting the ball head and a substantially cylindrical insertion region for inserting the ball head into the support region in an insertion direction. The support region is, for example, essentially hemispherical or cylindrical, in particular with chamfers on a cylinder base of the cylindrical support region facing away from the insertion region. A cylinder jacket surface of the insertion region is coaxial with an insertion axis along which the ball head is inserted. The insertion region is open to the support region and to a surrounding area of the base body, so that the ball head can be inserted from the surrounding area through the insertion region into the support region. The recess can have one or more depressions for receiving a lubricant to reduce friction between the ball head and the base body.

The ball socket comprises a securing element, wherein the securing element comprises a connecting region and two retaining legs connected to each other by the connecting region.

The base body comprises two retaining channels open to the insertion region, the retaining legs being arranged in the retaining channels in such a way that the retaining legs are essentially aligned along a retaining axis running through a center point of the support region and orthogonal to the insertion direction, and that the free end portions of the retaining legs remote from the connecting region are arranged at least in sections in the insertion region. The end sections lie against the ball head inserted into the support region to prevent the ball head from being pulled out of the support region. The center point of the support region corresponds to the center point of the ball head inserted into the support region.

The retaining legs are arranged completely inside the base body. This protects the retaining legs from damage, and the ball socket is particularly compact.

The retaining channels are bent from the insertion region towards the retaining axis. The retaining channels therefore do not extend outwards from the insertion region along a straight line orthogonal to the insertion direction, nor are they bent against the insertion direction, but rather bent towards the insertion direction.

When the ball head is pushed into the support region in the insertion direction, the free end portions of the retaining legs can be elastically bent by the ball head out of the insertion region into the retaining channels on a path that is bent towards the retaining axis. The free end portions are guided in the bent retaining channels out of the insertion region so that the ball head can be inserted between the retaining legs into the support region. As the bending is elastic, the free end portions spring back after the ball head has been pushed into the insertion region to fix the ball head in the support region. The retaining legs then rest against the ball head inserted into the support region to prevent the ball head from being pulled out of the support region.

Beneficial Effects

The retaining channels, which are bent towards the retaining axis, cause the ball head to exert a force on the free end portions when it hits the retaining legs in the insertion direction, so that the free end portions are bent out of the insertion region into the retaining channels and thus clear the way for the ball head into the support region. This allows the ball head to be pushed into the support region with little effort.

If a force acts on the ball head inserted into the support region against the insertion direction, the retaining channels bent towards the retaining axis cause the ball head, when it hits the retaining legs against the insertion direction, to cause a force on the free end portions acting into the insertion region, so that the free end portions remain in the insertion region and thus block the path for the ball head out of the support region. The ball head is thus securely fixed in the support region.

Compared to straight retaining channels, bent retaining channels have the advantage that less space is required orthogonal to the insertion direction for the free end portions of the retaining legs to clear the insertion region. This makes the ball socket particularly compact. In addition, the retaining legs are twisted by the curved retaining channels when they are bent out of the insertion region, which results in an additional restoring force that additionally supports the springing back of the free end portions into the insertion region.

Furthermore, the securing element, which in the simplest case consists only of the retaining legs and the connecting region, can have a very simple design and/or be made of a corrosion-resistant material, in particular a plastic.

DESCRIPTION OF THE EMBODIMENTS

The retaining channels are shaped as sections of a cylinder jacket coaxial to the retaining axis. This symmetrical design of the retaining channels in relation to each other and to the retaining axis leads to a particularly uniform material load on the ball socket and thus to a particularly high mechanical stability. In this configuration, the free end portions of the retaining legs can be elastically bent by the ball head out of the insertion region into the retaining channels on a circular path around the retaining axis when the ball head is inserted into the support region.

The securing element is guided by the base body along the retaining axis so that it can slide into the base body. This allows the securing element to be pushed into the base body without the securing element or tools employed to insert the securing element hindering the ball head from being pushed into the ball socket along the insertion direction.

The securing element comprises a fixing leg connected to the retaining legs by the connecting region, whereby the fixing leg comprises a fixing element, a latching element, for fixing the securing element to the base body against displacement of the securing element along the retaining axis out of the base body. The fixing element, which can for example be a latching element or clamping element for fixing to a suitable mating element of the base body, prevents unintentional displacement of the securing element out of the base body, whereby the ball head could come loose from the ball socket in an uncontrolled manner.

The securing element comprises a release element for releasing the fixing element from the base body. The release element is, for example, a tool attachment, in particular attached to the fixing leg, such as a slot for engaging a screwdriver. Using the tool that engages with the tool attachment, the fixing leg can be bent, for example, so that the fixing element detaches from the base body.

The fixing leg is aligned parallel to the retaining legs. This makes it easy to slide the securing element into the base body along the retaining axis.

The base body comprises a fixing channel, whereby the fixing leg is guided in the fixing channel along the retaining axis. The fixing channel simplifies the insertion of the securing element into the base body. In addition, the fixing leg is protected from damage in the fixing channel. The fixing channel can be open to an area surrounding the base body on a side facing away from the recess, so that the fixing leg is easier to access, for example to detach the fixing element from the base body.

The fixing channel is arranged in the base body on the side of the support region facing away from the insertion region. As a result, the fixing leg in the fixing channel does not hinder the insertion of the ball head into the support region.

The base body comprises a locking element for non-destruction free releasable locking of the fixing element on the base body. The locking element, which is, for example, a bar holding the fixing element on the base body, in particular a bar over the fixing channel, prevents unnoticed removal from the base body and reinsertion into the base body of the securing element. When the securing element is removed, the securing element, in particular a fixing element and/or a free end portion of a retaining leg of the securing element, can be damaged. For safety reasons, a removed securing element should therefore not be used again in the ball socket.

The fixing element can, for example, be designed in such a way that the securing element can only be pulled out of the base body by tearing off the fixing element from the fixing leg, especially when the fixing element is locked by the locking element.

The free end portions of the retaining legs are rounded. This simplifies the insertion of the ball head between the end sections into the support region.

The retaining channels and/or the retaining legs, in particular the retaining channels and the retaining legs, have a rounded cross-sectional area orthogonal to the retaining axis, a kidney-shaped cross-sectional area. A rounded cross-sectional area prevents the retaining legs from jamming when their free end portions are bent out of the insertion region into the retaining channels, which could make it more difficult or prevent the free end portions from springing back. The kidney shape is particularly desired for preventing jamming and ensuring high mechanical stability of the retaining legs.

The base body comprises a depression to accommodate the connecting region of the securing element. This protects the connecting region from damage and the ball socket is particularly compact.

The base body is made of a polyamide and/or a fibre-reinforced plastic, a glass fibre-reinforced polyamide. These materials ensure stable, reliable and low-friction support of the ball head in the support region of the recess in the base body.

The securing element is made of plastic, in particular of polyoxymethylene. A plastic securing element is corrosion-resistant and can be produced cost-effectively, for example by injection moulding. Polyoxymethylenes are characterised by good recovery behaviour and a high elongation at break and are therefore particularly suitable so that the fixing leg is elastically bent when the securing element is inserted into the base body and/or the retaining legs are elastically bent when the ball head is inserted into the support region and spring back into their initial position.

The base body comprises a connection element for connecting the base body along the retaining axis to a length-adjustable unit, to a linear drive or to a spring, to a spindle drive or to a gas pressure spring. The connection element comprises, for example, a thread for screwing on or a plug connector for plugging onto the unit along the retaining axis.

Because the base body can be connected to the length-adjustable unit along the retaining axis, the securing element can be inserted into the base body from the opposite side along the retaining axis, and the ball head can be inserted into the support region in the insertion direction orthogonal to the retaining axis without the unit, the securing element and the ball head or the employed tools interfering with each other.

BRIEF DESCRIPTION

Some of the embodiments will be described in detail, with references to the following Figures, wherein like designations denote like members, wherein.

DETAILED DESCRIPTION

Figure 1:
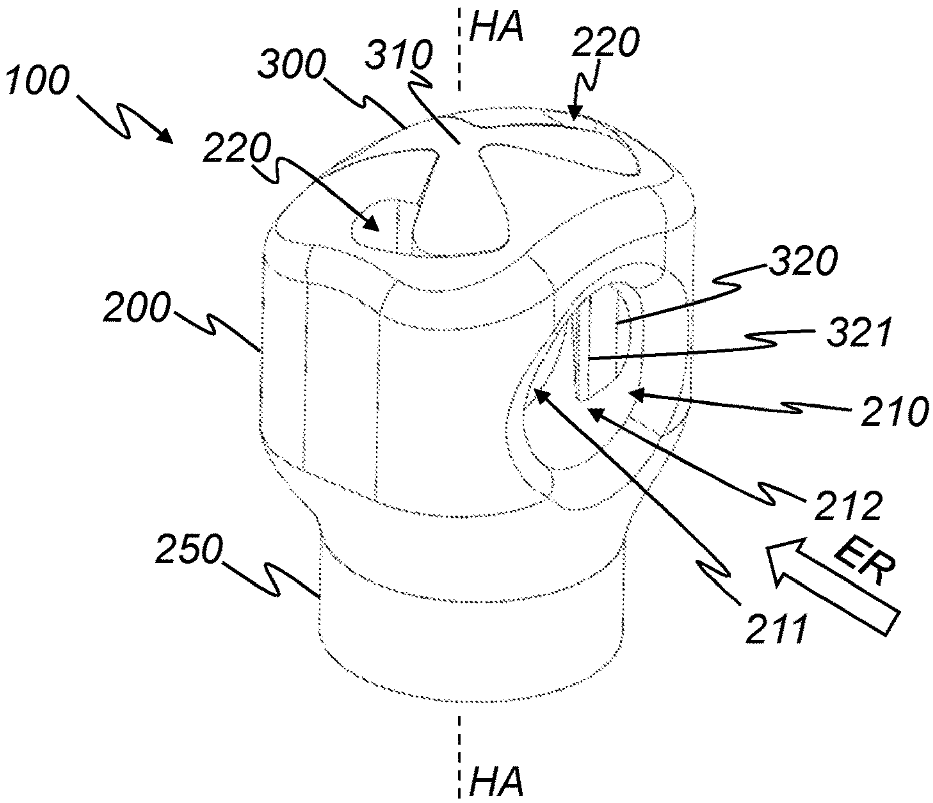
FIG. 1 shows a schematic view of a ball socket according to embodiments of the invention.

FIG. 1 shows a schematic view of a ball socket 100 according to embodiments of the invention.

The ball socket 100 for a ball joint comprises a base body 200 with a recess 210 for receiving a ball head of the ball joint, wherein the recess 210 comprises a support region 211 for supporting the ball head and a cylindrical insertion region 212 for inserting the ball head in an insertion direction ER into the support region 211.

The ball socket 100 comprises a securing element 300, wherein the securing element 300 comprises a connecting region 310 and two retaining legs 320 interconnected by the connecting region 310, only one of the retaining legs 320 being visible in FIG. 1.

The base body 200 comprises two retaining channels 220 open to the insertion region 212, wherein the retaining legs 320 are arranged in the retaining channels 220 such that the retaining legs 320 are aligned along a retaining axis HA extending through a center point of the support region 211 and orthogonal to the insertion direction ER, and that the free end portions 321 of the retaining legs 320 remote from the connecting region 310 are arranged in sections in the insertion region 212.

The retaining channels 220 are bent from the insertion region 212 towards the retaining axis HA, wherein the free end portions 321 of the retaining legs 320 are elastically bendable by the ball head out of the insertion region 212 into the retaining channels 320 on a path curved towards the retaining axis HA when the ball head is inserted into the support region 211, so that the free end portions 321 spring back after the ball head is inserted into the insertion region 212 to fix the ball head in the support region 211.

The base body 200 comprises a connecting element 250 for connecting the base body 200 along the retaining axis HA to a length-adjustable unit.

Figure 2:
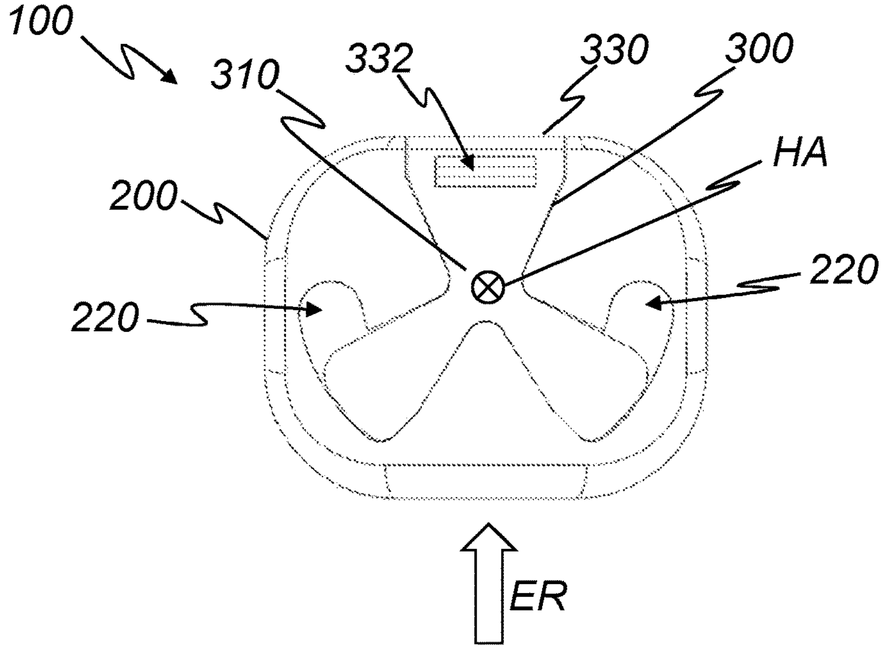
FIG. 2 shows a further schematic view of a ball socket according to embodiments of the invention.

FIG. 2 shows a further schematic view along the retaining axis HA of a ball socket 100 according to embodiments of the invention. Features already shown in FIG. 1 can be designed as there and are not described again.

The retaining channels 220 of the ball socket 100 shown in FIG. 2 are shaped as sections of a cylinder jacket coaxial with the retaining axis HA, wherein the retaining channels 220 have a rounded, in particular kidney-shaped, cross-sectional area orthogonal to the retaining axis HA.

The securing element 300 shown in FIG. 2 comprises a fixing leg 330 connected to the retaining legs 320 by the connecting region 310, wherein the fixing leg 330 comprises a fixing element 331, not visible in FIG. 2, for fixing the securing element 300 to the base body 200 against displacement of the securing element 300 along the retaining axis HA out of the base body 200.

The securing element 300 shown in FIG. 2 comprises a release element 332, for example a slot for receiving a screwdriver, for releasing the fixing element 331 from the base body 200.

Figure 3:
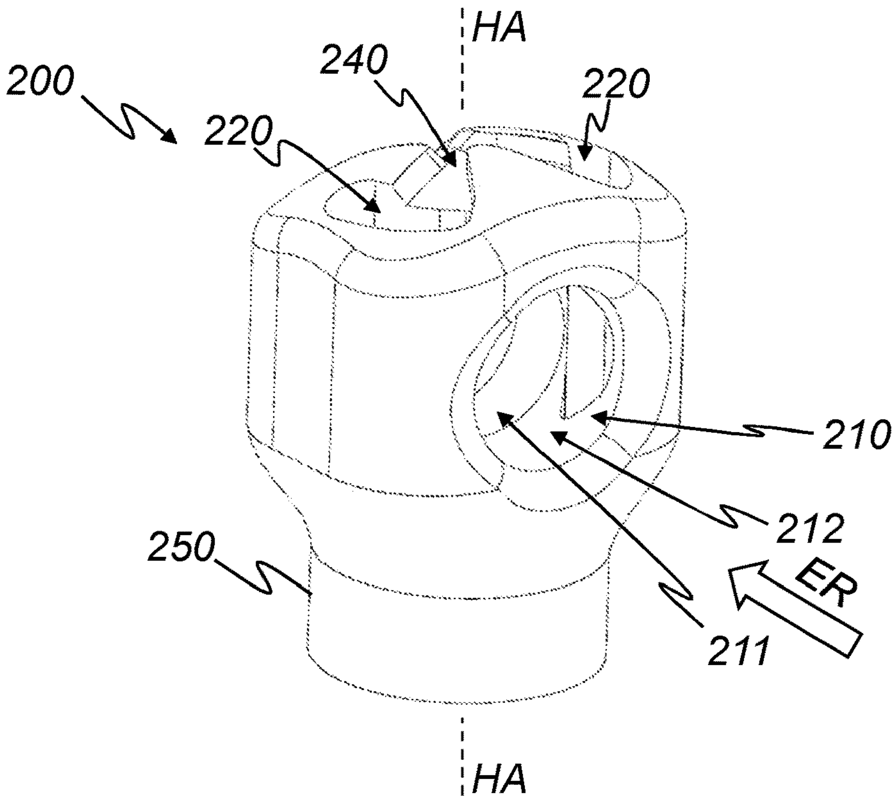
FIG. 3 shows a schematic view of the base body of a ball socket according to embodiments of the invention.

FIG. 3 shows a schematic view of the base body 200 of a ball socket 100 according to embodiments of the invention. Features already shown in one of the previous figures can be designed as there and are not described again.

The base body 200 shown in FIG. 3 comprises a depression 240 for receiving the connecting region 310 of the securing element 300.

Figure 4:
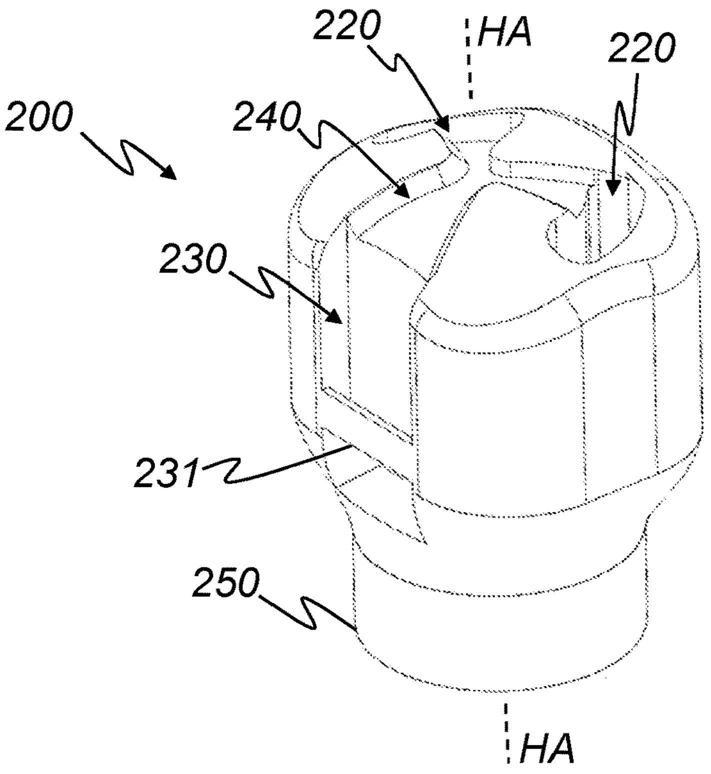
FIG. 4 shows a further schematic view of the base body of a ball socket according to embodiments of the invention.

FIG. 4 shows a further schematic view of the base body 200 of a ball socket 100 according to embodiments of the invention. Features already shown in one of the previous figures can be designed as there and are not described again.

The base body 200 shown in FIG. 4 comprises a fixing channel 230 for guiding the fixing leg 330 of the securing element 300 in the fixing channel 230 along the retaining axis HA. The fixing channel 230 is open, for example, on a side facing away from the recess 210 towards an environment of the base body 200.

The base body 200 shown in FIG. 4 comprises a locking element 231, for example a bar over the fixing channel 230, for non-destruction free releasable locking of the fixing element 331 of the fixing leg 330 of the securing element 300 to the base body 200. The locking element 231 prevents, for example, the fixing leg 330 from being bent away from the base body 200 in such a way that the fixing element 331 becomes detached from the base body 200.

Figure 5:
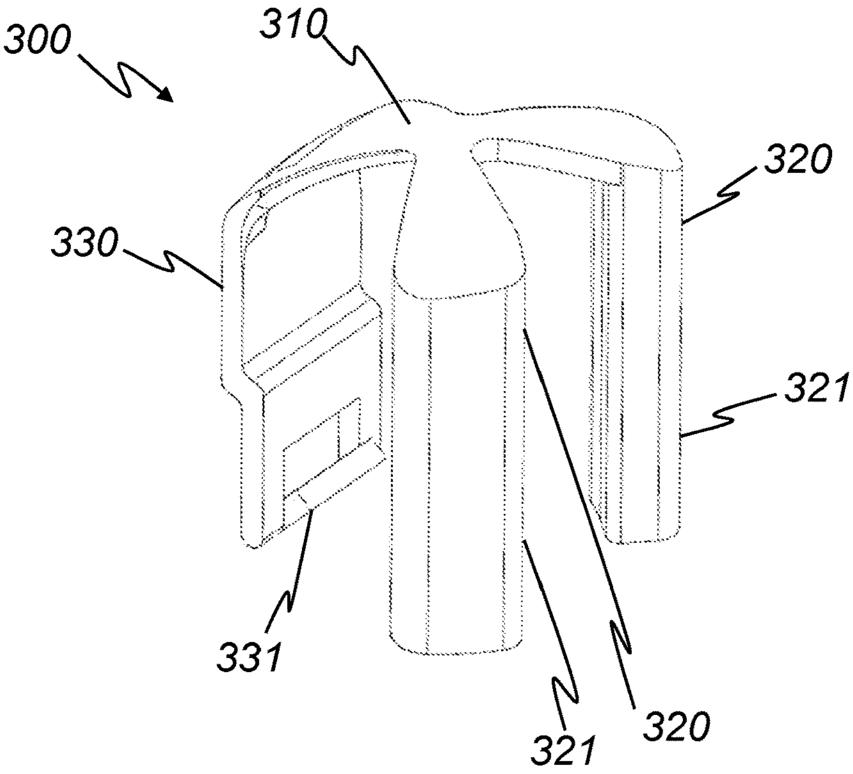
FIG. 5 shows a schematic view of the securing element of a ball socket according to embodiments of the invention.

FIG. 5 shows a schematic view of the securing element 300 of a ball socket 100 according to embodiments of the invention. Features already shown in one of the previous figures can be designed as there and are not described again.

The fixing leg 330 of the securing element 300 shown in FIG. 5 comprises a fixing element 331, for example a latching element, for fixing the securing element 300 to the base body 200 against displacement of the securing element 300 along the retaining axis HA out of the base body 200.

The fixing leg 330 shown in FIG. 5 is aligned parallel to the retaining legs 320.

The free end portions 321 of the retaining legs 320 of the securing element 300 shown in FIG. 5 are rounded, wherein the retaining legs 320 have a rounded, in particular kidney-shaped, cross-sectional area orthogonal to the retaining axis HA.

Figure 6:
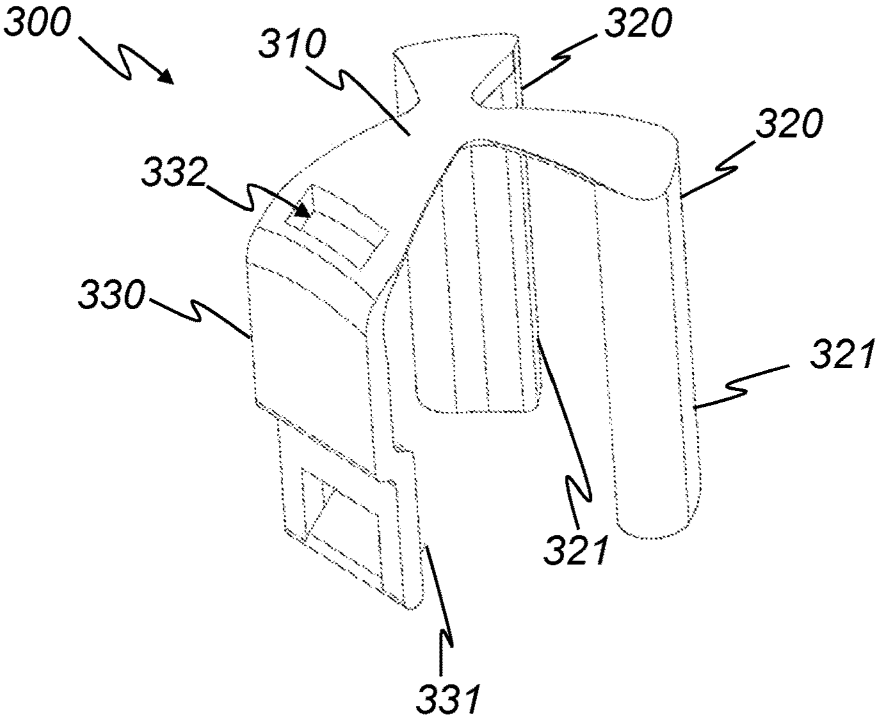
FIG. 6 shows a further schematic view of the securing element of a ball socket according to embodiments of the invention.

FIG. 6 shows a further schematic view of the securing element 300 of a ball socket 100 according to embodiments of the invention. Features already shown in one of the previous figures can be designed as there and are not described again.

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference signs | |
|---|---|
| 100 | Ball socket |
| 200 | Base body |
| 210 | Recess |

-continued

| List of reference signs | |
|---|---|
| 211 | Support region |
| 212 | Insertion region |
| 220 | Retaining channel |
| 230 | Fixing channel |
| 231 | Locking element |
| 240 | Depression |
| 250 | Connecting element |
| 300 | Securing element |
| 310 | Connecting region |
| 320 | Retaining leg |
| 321 | Free end portion |
| 330 | Fixing leg |
| 331 | Fixing element |
| 332 | Release element |
| ER | Insertion direction |
| HA | Retaining axis |

The invention claimed is:

1. A ball socket for a ball joint comprising:

a base body comprising an upper wall and a sidewall surrounding a retaining axis, the upper wall and the sidewall defining a cavity therein with a recess for receiving a ball head of the ball joint, wherein the recess comprises a support region centrally disposed within the cavity for supporting the ball head, a center point of the support region lying on the retaining axis, and a cylindrical insertion region extending through the sidewall for inserting the ball head in an insertion direction along an insertion axis into the support region, the insertion axis being orthogonal to the retaining axis; and a securing element comprising a connecting region and two parallel retaining legs connected to one another by the connecting region;

wherein the upper wall of the base body comprises two opposing retaining channels extending therethrough into the insertion region for receiving the retaining legs, and a depression extending therebetween in the upper wall for receiving the connecting region;

wherein the retaining legs are arranged in the retaining channels such that the retaining legs are parallel to the retaining axis, and that free end portions of the retaining legs remote from the connecting region are arranged in sections in the insertion region;

wherein the retaining legs are arranged completely inside the base body;

wherein the retaining channels each extend outward from the insertion region along an arcuate path that is curved about the retaining axis and extends from the depression in the insertion direction, and the retaining channels are opposing circular segments coaxial with the retaining axis; and wherein the free end portions of the retaining legs are each bent elastically by the ball head out of the insertion region into the retaining channels along the arcuate path about the retaining axis in the insertion direction when the ball head is pushed through the insertion region into the support region, so that the free end portions spring back after the ball head has been pushed into the support region in order to fix the ball head therein.

2. The ball socket according to claim 1, wherein the securing element is displaceably guided by the base body into the base body along the retaining axis.

3. The ball socket according to claim 1, wherein the securing element comprises a fixing leg connected to the retaining legs by the connecting region; and wherein the fixing leg comprises a fixing element for fixing the securing element to the base body against displacement of the securing element along the retaining axis out of the base body.

4. The ball socket according to claim 3, wherein the securing element comprises a release element for releasing the fixing element from the base body.

5. The ball socket according to claim 3, wherein the fixing leg is aligned parallel to the retaining legs.

6. The ball socket according to claim 3, wherein the base body comprises a fixing channel; and wherein the fixing leg is guided in the fixing channel along the retaining axis.

7. The ball socket according to claim 3, wherein the base body comprises a locking element for non-destruction free releasable locking of the fixing element to the base body.

8. The ball socket according to claim 1, wherein the free end portions of the retaining legs are rounded.

9. The ball socket according to claim 1, wherein the retaining channels and/or the retaining legs have a rounded cross-sectional area orthogonal to the retaining axis.

10. The ball socket according to claim 1, wherein the base body consists of a polyamide and/or a fibre-reinforced plastic.

11. The ball socket according to claim 1, wherein the securing element consists of a plastic material.

12. The ball socket according to claim 1, wherein the base body comprises a connecting element for connecting the base body along the retaining axis to a length-adjustable unit.

* * * * *